United States Patent

Arlt, III et al.

[11] Patent Number: 5,271,630
[45] Date of Patent: Dec. 21, 1993

[54] CONDUIT SEAL

[76] Inventors: Edward J. Arlt, III, 1018 Ross Trail, Arlington, Tex. 76012; Charles M. Reinhardt, 2208 Prestonwood, Arlington, Tex. 76012; George W. Peppel, 3204 Wild Oak Ct., Arlington, Tex. 76016

[21] Appl. No.: 844,091

[22] Filed: Mar. 2, 1992

Related U.S. Application Data

[63] Continuation of Ser. No. 325,576, Mar. 20, 1989, abandoned.

[51] Int. Cl.[5] .............................................. F16J 15/46
[52] U.S. Cl. ...................................... 277/34; 277/181; 277/189; 405/224
[58] Field of Search ................ 277/10, 34, 34.3, 34.6, 277/181, 185, 189, 149, 150, 192, 199, 220; 138/93, 148; 166/187, 212; 405/224, 225

[56] References Cited

U.S. PATENT DOCUMENTS 2,822,192  2/1958  Beatty ................................. 277/34.3
3,884,261  5/1975  Clynch ......................... 277/34.6 X

FOREIGN PATENT DOCUMENTS 13012  9/1915  United Kingdom ............... 277/34.3

Primary Examiner—William A. Cuchlinski, Jr.
Assistant Examiner—Scott W. Cummings

[57] ABSTRACT

An improved conduit seal is provided for the upper connector assembly (10) of a TLP where the upper end of a tether (14) is pivotally secured within the tether conduit (38) of a floating platform (12). The conduit seal includes an annular elastomeric seal (48) and a series of mounting blocks (52) bonded thereto. The tether mounts a CLB housing (24) which has an annular lip (74) with a continuous groove (80). Each of the mounting blocks is provided with a locking pin (84) which can be hydraulically driven into the groove (80) to lock the mounting blocks on the CLB housing, and confine the seal (48) relative to the CLB housing.

14 Claims, 3 Drawing Sheets

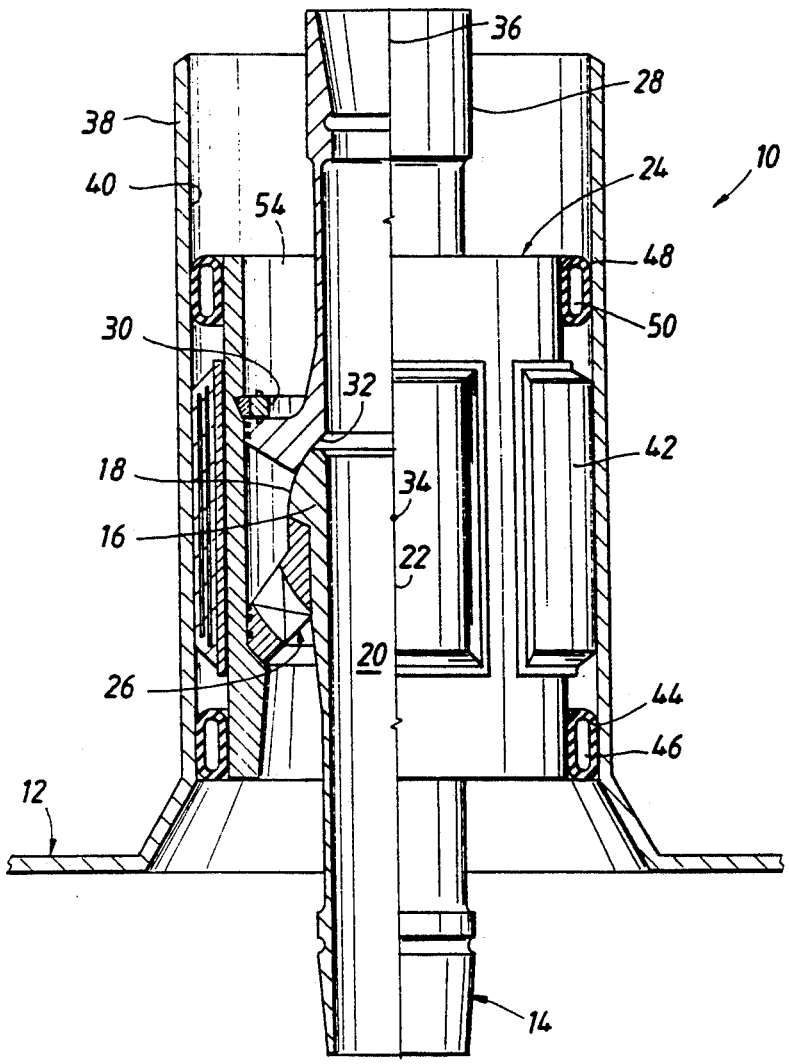
FIG.1
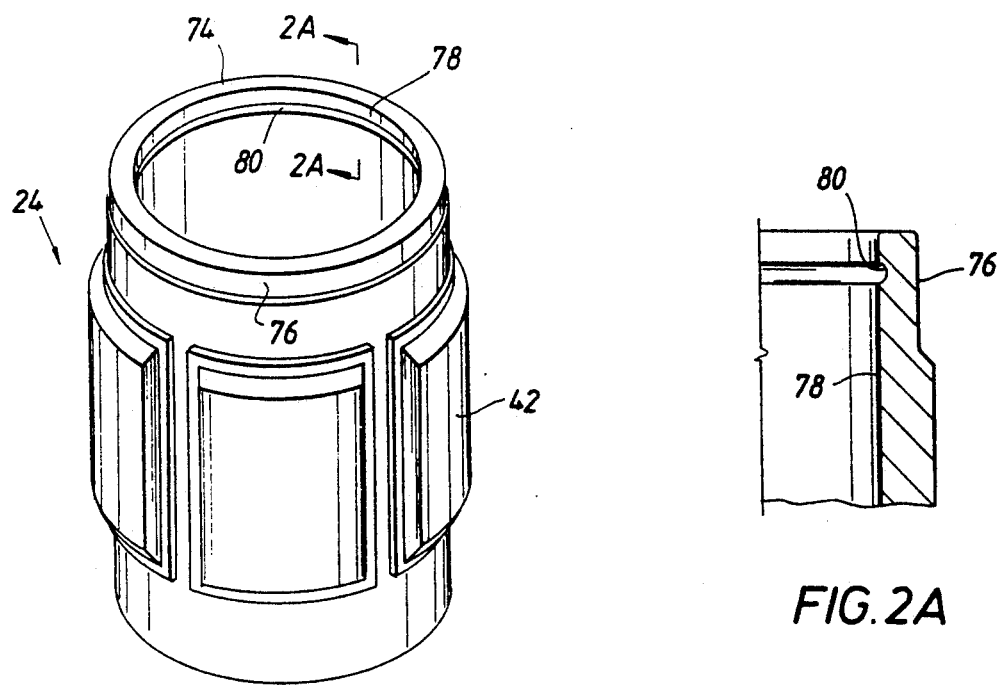
FIG.2
FIG.2A

CONDUIT SEAL

This is a continuation of application Ser. No. 325,576, filed Mar. 20, 1989, now abandoned.

TECHNICAL FIELD

This invention relates to a component for a tension leg platform (TLP), and particularly to a seal for the conduit housing.

BACKGROUND OF THE INVENTION

The need for ongoing exploration and production of fossil fuels is fundamental to the existence of industrialized societies. As fossil fuel reservoirs underground are depleted, there is much activity in offshore exploration and production.

The tension leg platform (TLP) has become an important part of this offshore production. Essentially, the TLP is a floating platform which is connected to the sea floor through a plurality of relatively long and thin tension bearing elements referred to a tethers. Flexible joints are provided at both the lower and upper end of each tether, which permits the platform to move relative to the sea floor under the action of wave, wind and tide.

In one design, the upper end of the tether is provided with a flex joint and a CLB housing. The flex joint is connected between the tether itself and the inside of the CLB housing, which permits the tether to pivot relative to the CLB housing. A tether extension will provide a socket for the top end of the tether to maintain the pivot point of the tether along the central axis of symmetry of the CLB housing and also maintain the elastomeric elements of the flex joint in compression to lengthen their service life.

The CLB housing, in turn, is positioned within a tether conduit which forms part of the floating platform. The tether conduit defines an inner cylindrical surface, in which is the CLB housing, flex joint and upper end of the tether. Radial bearings are provided between the CLB housing and the inner surface of the tether conduit to transfer side loads between the conduit and CLB housing. The tether conduit, and thus the floating platform, can move vertically relative to the CLB housing and tether by permitting the housing to slide along the inner cylindrical surface of the tether conduit. Due to the flex joint between the upper tether end and the CLB housing, the platform can also pivot relative to the tether about the tether pivot point.

As can readily be understood, buoyancy is only achieved by displacing water with a water tight structure whose weight is less than the water displaced. By providing a seal between the CLB housing and inner cylindrical surface of the tether conduit, the voids above the CLB housing within the tether conduit can be kept dry to enhance the buoyancy of the platform. Therefore, in the past, seals have been designed and installed in TLP environments to perform this function. Typically, two seals are provided for each CLB housing, one near the bottom of the CLB housing below the radial bearings and one near the top of the CLB housing above the radial bearings. In the prior design, the seals consisted of inflatable donut shaped elastomeric bladders which were inflated by air to press against the CLB housing and inner surface of the tether conduit. The seals were designed to roll along the inner cylindrical surface of the conduit to compensate for any axial motion between the CLB housing and tether conduit. Anticipated relative axial motion was relatively small, about 95 mm, and a rolling type seal was believed to be adequate.

However, over time, many of these tube seals failed. While none of the failures were major operational problems, but merely relative slow leakage of a fluid into the sealed areas rather than rapid flooding, the seal failures contributed to three abnormal operating conditions.

In certain cases, construction debris and tools fell into the tether conduit and were allowed to remain on the operational tube seals. This resulted in puncturing some of the tube seals. Construction debris included such items as welding slag, metal cuttings and shavings, as well as large pieces of metal. That debris had lodged between the tube seal and its mounting structure, as well as between the tube seal and conduit wall.

Another problem arose in incorrect installation in a displaced configuration which precluded the seal's function for its designed purpose of accommodating vertical motion through rolling of the seal. Vertical displacements of the conduit relative to the CLB housing resulted in tears at the root area of several seals due to high stress. The inter-leaved layers of rubber and woven fabric in that area of the seals separated and tore.

The prior designs anticipated no yaw condition, i.e. where the CLB housing would become canted within the tether conduit, nor to accommodate torsional motion between the vertical axis of the tether and the vertical axis of the tether conduit. However, such motion occurred, which led to rubber to fabric bond failures within the seal reinforcing material as well as abrasion of the seal itself. The rubber tube fabric bond failures were further aided and abetted by exposure of the reinforcing fabric to the seawater. Cuts and abrasions in the tube seal exposed the fabric reinforcement to seawater. The fabric then absorbed and wicked water between the interleaved layers of fabric and cord, thereby providing an additional means of rubber to fabric bond failure.

A need therefore exists for an improved sealing procedure for the seal between a CLB housing and a tether conduit to maintain the buoyancy provided by proper operation of that seal, preferably for the lifetime operation of the platform of 20-30 years.

SUMMARY OF THE INVENTION

In accordance with one aspect of the present invention, a seal assembly is provided for sealing between a first member having a cylindrical inner surface centered on a first axis and a second member having a cylindrical outer surface centered on a second axis. The seal assembly includes an annular inflatable seal positioned between the cylindrical inner surface and the cylindrical outer surface of the members. The seal assembly further includes at least one mounting block secured to one of the members to prevent the seal from moving along the axis of the member in a first direction.

In accordance with another aspect of the present invention, the member on which the mounting block is secured defines a lip having an inner annular surface and an outer annular surface, with the mounting block secured to the member at the lip. In accordance with another aspect of the invention, the inner annular surface of the lip has a continuous groove to receive a locking pin on the mounting block to secure the mounting block to the member, permitting the locking pin to be disengaged from the groove for removal of the mounting block and seal.

In accordance with another aspect of the present invention, the mounting block is bonded to the seal. Multiple mounting blocks can be provided, each with a lock pin for entry into the continuous groove. The seal can have a first end and a second end, the first end having a female socket with a plurality of shoulders and the other end having a male portion with a plurality of shoulders, the male portion inserted into the female socket to form a unitary ring upon inflation of the seal.

BRIEF DESCRIPTION OF THE DRAWINGS

For a more complete understanding of the present invention, and for further advantages thereof, reference is now made to the following Detailed Description taken in conjunction with the accompanying drawings, in which:

FIG. 1 is a vertical cross sectional view of the connection between a tether and tether platform in a TLP;

FIG. 2 is a perspective view of a CLB housing; FIG. 2A is a cross sectional view of a portion of the CLB housing of FIG. 2 taken at line 2A—2A in FIG. 2;

DETAILED DESCRIPTION

Figure 3:
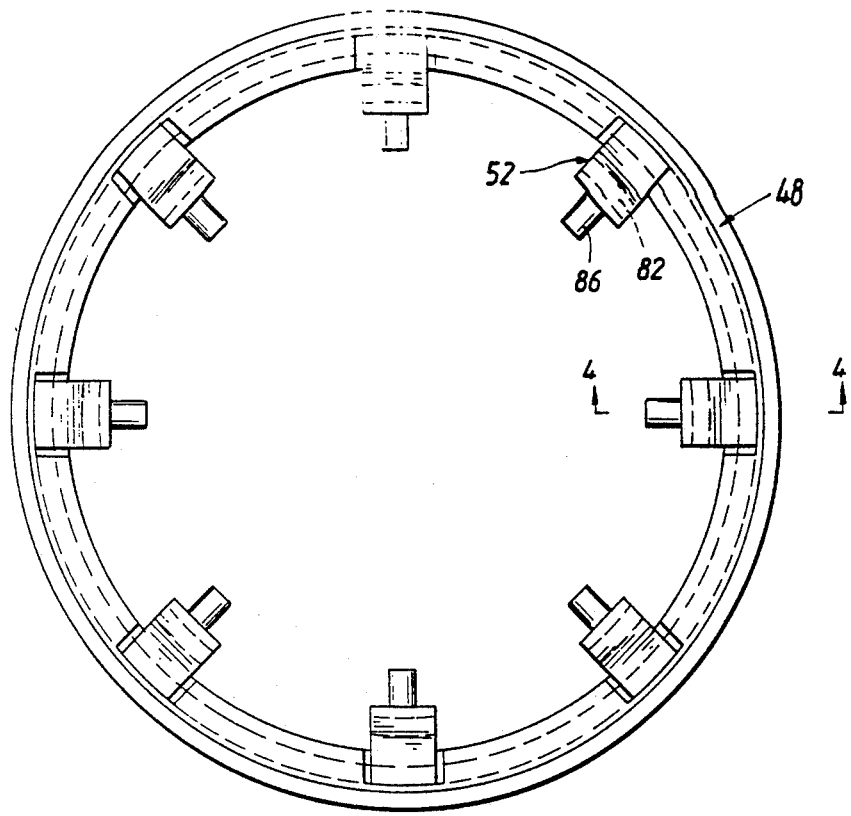
FIG. 3 is a plan view of a seal and mounting blocks.

With reference now to the accompanying drawings, wherein like reference numerals designate like and corresponding parts throughout the several views, FIG. 1 illustrates a connector assembly 10 for connecting the floating platform 12 of a TLP to the upper end of a tether 14. As described previously, it is desirable to accommodate horizontal, vertical and pivoting motion between the tether and the floating platform, while maintaining the open volumes between the tether and floating platform free from water to enhance the buoyancy of the floating platform.

The tether 14 defines an upper end 16 having a semispherical surface 18. Preferably, the tether 14 is a hollow tube or pipe having a watertight passage 20 which provides buoyancy to the tether. The tether 14 has a central axis of symmetry 22, and is preferably mounted to a pivot connection at the sea floor (not shown), which allows the tether to pivot relative to the sea floor while retaining its watertight integrity and without placing excessive bending forces on the tether.

A cylindrical CLB housing 24 is concentrically positioned about the upper end 16 of the tether and connected to the tether through a flex joint 26. A tether extension 28 is removably mounted within the CLB housing by a ring 30. The tether extension 28 has a semi-spherical surface 32 which is in contact with the surface 18 of the tether. The tether extension 28 thus ensures that any pivoting motion between the tether 14 and the CLB housing 24 will occur about a pivot point 34 along the central axis of symmetry 22 of the tether and the central axis of symmetry 36 of the CLB housing. Further, the tether extension 28 can be secured to the CLB housing to maintain the elastomeric elements of the flex joint 26 in compression, enhancing the service life of the flex joint.

The CLB housing, in turn, is positioned within the tether conduit 38 of the floating platform. The tether conduit defines an inner cylindrical surface 40 which is sufficiently long to accommodate any anticipated vertical motion between the floating platform and the upper end of the tether. Radial bearings 42 are mounted on the exterior surface of the CLB housing to bear against the inner cylindrical surface 40 and center the CLB housing within the tether conduit.

A lower conduit seal 44 is positioned between the outer surface of the CLB housing and the inner cylindrical surface 40 below the radial bearings. The lower conduit seal has a hollow airtight passage 46 therethrough which can be pressurized by high pressure air, 100 psi for example, to urge the seal 44 into sealing engagement with both the tether conduit and the CLB housing.

Figure 4:
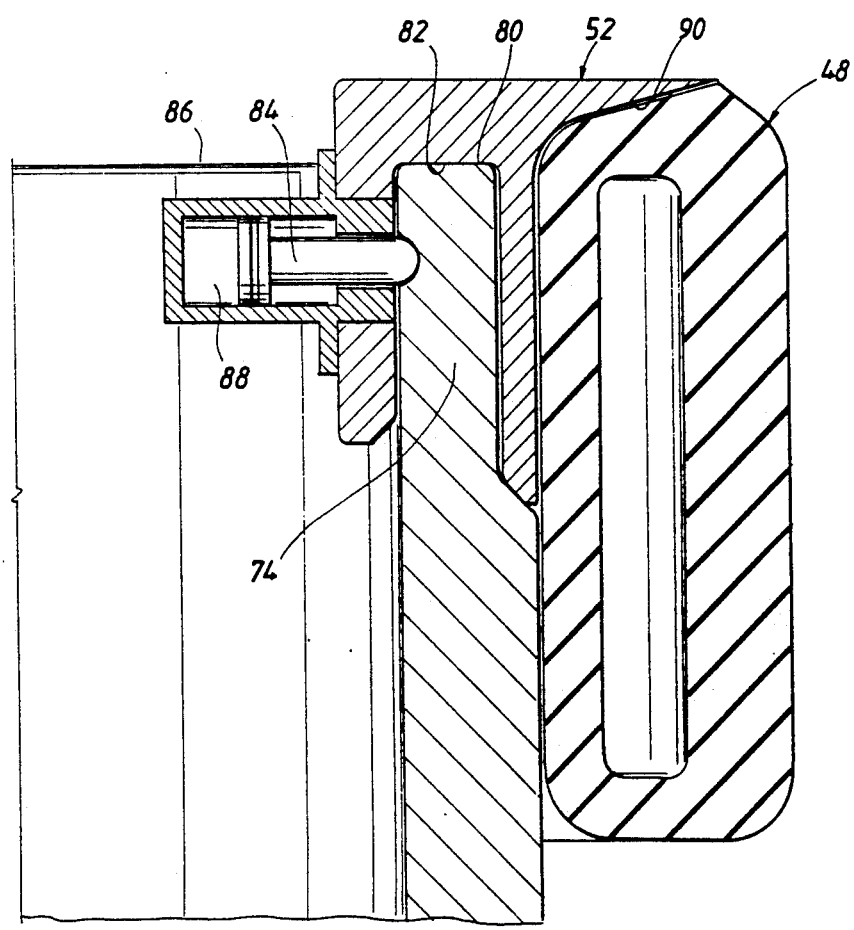
FIG. 4 is a vertical cross sectional view of the cooperation between the seal, mounting block and CLB housing.

A similar upper conduit seal 48 is positioned between the inner cylindrical surface 40 and the outer surface of the CLB housing 24 above the radial bearings. The upper conduit seal also defines a central airtight passage 50 which permits the entry of pressurized air to form a seal between the tether conduit and the CLB housing. However, in addition, the upper conduit sea has mounted thereon a series of mounting blocks 52, as best seen in FIGS. 3 and 4, which allow attachment of the upper conduit seal 48 to the upper end 54 of the CLB housing.

It has been determined that the rolling type of configuration for seals as used in prior designs has several disadvantages. The rolling function requires a relatively thin wall seal, which is more subject to damage. Further, the rolling seal is dynamically unstable because there is no way to guarantee that it will not creep up or down between the CLB housing and tether conduit instead of simply deflecting in the intended rolling mode. The seals 44 and 48 are intended to slip or rub against a mating surface, rather than roll with it. Thus, the seals 44 and 48 act as a sliding seal, much the same as a swab cup or a piston ring. This permits the seal to be made with very thick walls which helps prevent punctures due to debris and also be less susceptible to tear and bond failures due to the rolling. The heavy wall construction will not detrimentally affect the accommodation of yaw.

Figure 5:
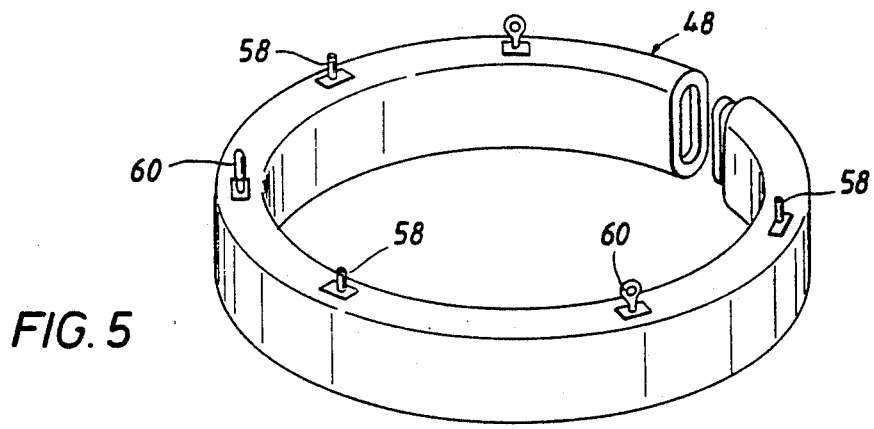
FIG. 5 is a perspective view of the seal.
Figure 6:
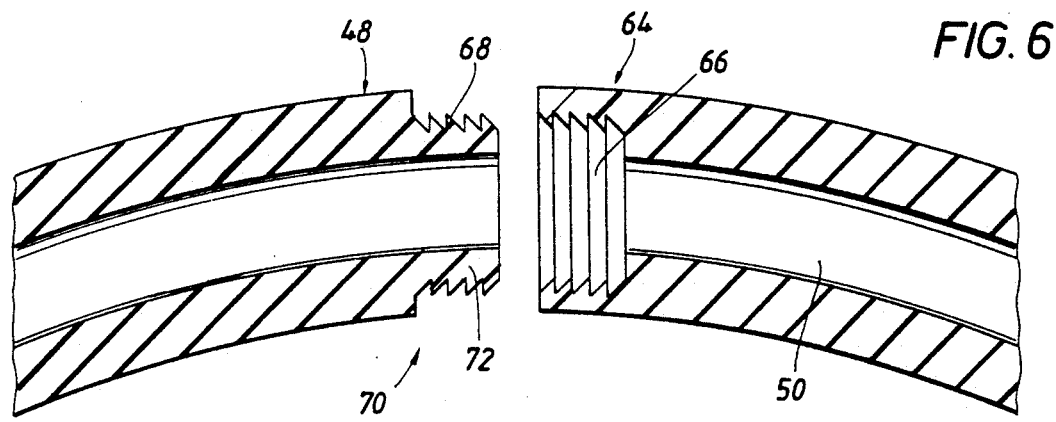
FIG. 6 is a cross sectional plan view of the mating ends of the seal.
Figure 7:
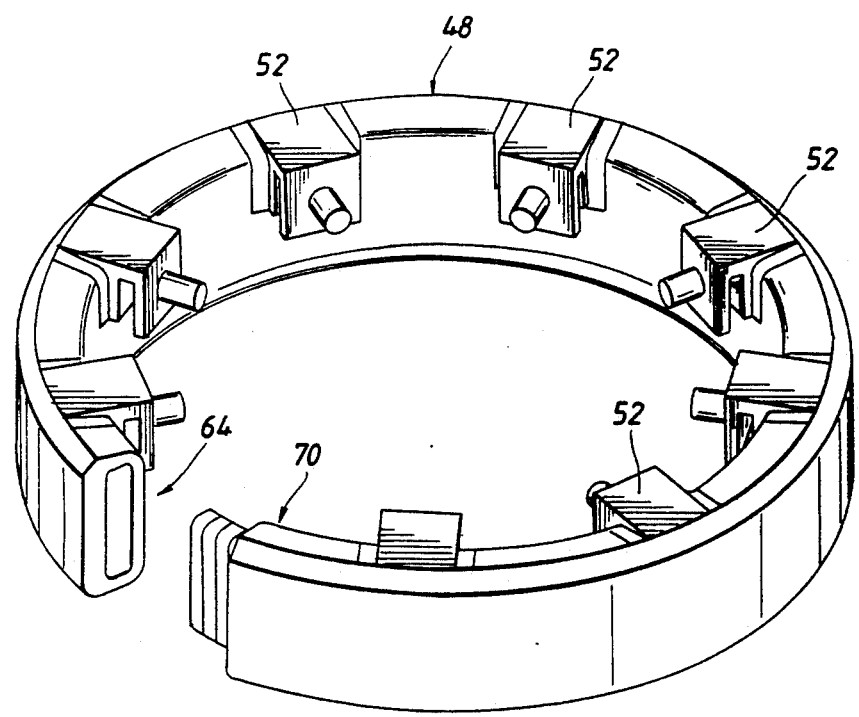
FIG. 7 is a perspective view of the seal and mounting blocks.

With reference to FIGS. 5, 6 and 6, details of the seals 44 and 48 are better illustrated. The seal body 56 of each seal is built up of rubber and fabric interleaved in alternating layers and then molded into a composite assembly. Inflation stems 58 and handling rings 60 are external to the top of the seal body so as to make them readily accessible from above. The walls of the seal body are preferably configured through manipulation and design of the reinforcing fabric and rubber thickness so as to assure expansion of the body at both the inside and outside diameters when inflated, as well as to increase the vertical stability of the design.

To provide flexibility in certain connector assembly designs, the seals 44 and 48 must be separable along a make up joint 62. As such, a first end 64 of the seals can be provided with a female socket 66 with a series of rubber rings 68 formed along the wall of the socket. The second end 70 of the seal has a male portion 72, also having rubber rings 68. When the male portion is inserted in the female socket, and the seal inflated, the rubber rings 68 interlock, forming an annular seal without the need for mechanical fasteners or plates. Such a non-continuous annular seal is necessary if the seal is to be assembled around an installed tether. However, if the tether is disconnected above the CLB housing so that it can be lifted to the working platform on the floating platform, a continuous upper seal can be used. However, the lower seal must still be manufactured in the segmented design.

With reference to FIGS. 2, 2A, 3, 4 and 7, the design of the mounting blocks 52 can be discussed. The upper conduit seal 48 will be attached and fixed to the CLB housing 24 through blocks 52 so that the slippage of the seal occurs at the inner cylindrical surface 40. As can be seen in FIG. 2, the upper end of the CLB housing defines a lip 74 with an outer cylindrical surface 76 and an inner cylindrical surface 78. A continuous O-ring groove 80 is formed on the inner cylindrical surface 78.

The mounting blocks, best illustrated in FIG. 4, define a notch 82 to fit over a portion of the lip 74. Each mounting block further has a hydraulically actuated locking pin 84 within a double acting hydraulic cylinder 86 so that, when pressurized hydraulic fluid is entered into chamber 88, the locking pin 84 is extended into the groove 80 to lock the mounting block to the CLB housing. Another portion of the mounting block defines a curved face 90 which mirrors the outer surfaces of the seal where the mounting block and seal meet, and a suitable technique is employed to bond the seal to the face.

To assemble the upper conduit seal when the CLB is outside the tether conduit, the mounting blocks are simply fit over the lip 74 and the make up joint 62 is assembled, preferably with the assistance of an adhesive. At any appropriate point of assembly, the locking pins can be activated into the groove 80 and the seal inflated.

When installation is necessary after the CLB housing is positioned within the tether conduit, an unpressurized seal 48 is lowered down the tether conduit above the CLB housing by handling lines from the deck. The mounting blocks 52 are simply lowered over the lip 74 and the locking pins driven into the groove 80 by hydraulic pressure. Because the groove 80 is continuous, no concern is necessary for the angular orientation of the seal 48 relative to the CLB housing. A guide ramp geometry can be provided at the upper end of the CLB housing to assist seating of the mounting blocks.

To remove the seal, the seal need only be deflated, the hydraulic pins activated to withdraw from the groove 80, and the seal and mounting blocks lifted out of the tether conduit. Because the hydraulic actuation package, namely locking pins 84 and hydraulic cylinders 86, forms part of the seal, there is no dependence on an actuating system that is permanently located below and cannot be retrieved for repair or replacement.

The object of the seals is to assure a watertight seal between the seal, CLB housing and tether conduit. The differential pressure caused by seawater below the seal and the mounting blocks above the seal aid in this function. The desired coefficient of friction between the seal and CLB housing and tether conduit can be manipulated by variation of the surface area, surface texture, internal pressure and differential pressure in the seal design.

The seal itself is preferably of nylon fabric which has a specific strength per layer. The maximum force to be sustained will thus determine how many plies or layers of reinforcement must be included in the design. The number of plies will also determine the maximum sustainable pressure and the permissible inflation pressure. The seals basic construction will include a natural rubber inner bladder, a bias ply nylon cord fabric reinforcement, and a natural rubber outer cover. It is believed that natural rubber is a superior material for the construction of the inner bladder as compared to synthetic elastomers such as nitrile, neoprene and EPDM. This superiority of natural rubber is due to its higher tensile strength and elongation at comparable hardness and durometer values.

A pure rubber inflatable seal will not hold 100 psi when unconstrained. Reinforcement, such as nylon fabric, is necessary to accommodate this pressure. One suggested fabric reinforcement is a continuous nylon fabric with 0.0265 inch gauge cords, 26 cords per inch, and a tensile strength of approximately 1100 lbs per linear inch. The nylon cord will be rubber calandered to a thickness of 0.037/0.040 inches for fabrication and bonding purposes.

Natural rubber is preferred for the cover material of the seal as the water, aging, weather and abrasion resistance characteristics of the material are satisfactory. The material can bonded to the natural rubber or nylon cord bladder.

Although the present invention has been described with respect to one embodiment thereof, various changes and modifications may be suggested to one skilled in the art, and it is intended that the present invention encompass such changes and modifications as fall within the scope of the appended claims.

We claim:

1. A seal assembly for sealing between a first member having a cylindrical inner surface centered on a first axis and a second member having a cylindrical outer surface centered on a second axis, the first and second members positioned in a concentric relationship with the first and second axes coinciding with said first and second members capable of limited vertical and pivoting motion relative each other, comprising:

an annular inflatable seal slidably sealing across an annulus between the first and second members; and
at least one mounting block secured to one of said member in a first direction, said mounting block being removably secured to said member and removable from said member with the first and second members in the concentric relationship to permit the seal to be removed or installed from between said first and second members.

2. The seal assembly of claim 1 wherein the one of said members to which the mounting block is removably secured defines a lip having an inner annular surface and an outer annular surface, the mounting block being secured to the lip.

3. The seal assembly of claim 2 wherein a continuous groove is formed into one of the surfaces of said lip, said mounting block further comprising a locking pin movable between a release position and a locking position, the pin in the locking position entering the groove to secure the mounting block to said member.

4. The seal assembly of claim 1 wherein the seal is segmented, a first end of the seal having a male portion and a second end of the seal having a female portion, and male and female portions forming a joint to define a continuous annular seal.

5. The seal assembly of claim 1 wherein the mounting block is bonded to the seal.

6. The seal assembly of claim 1 wherein the first member is a tether conduit and the second member is a cross loading bearing housing.

7. A seal assembly for sealing between a first member having a cylindrical inner surface centered on a first axis and a second member having a cylindrical outer surface centered on a second axis, the first and second members positioned in a concentric relationship with the first and second axes coinciding with said first and second members capable of limited motion relative each other, comprising:

an annular inflatable seal; and at least one mounting block secured to one of said members to prevent the seal from moving along the axis of said member in a first direction, said mounting block being removably secured to said member and removable from said member with the first and second members in the concentric relationship to permit the seal to be removed or installed from between said inner cylindrical surface and said outer cylindrical surface.

8. The seal assembly of claim 7 wherein the one of said members to which the mounting block is removably secured defines a lip having an inner annular surface and an outer annular surface, the mounting block being secured to the lip.

9. The seal assembly of claim 7 wherein the seal is segmented, a first end of the seal having a male portion and a second end of the seal having a female portion, and male and female portions forming a joint to define a continuous annular seal.

10. The seal assembly of claim 7 wherein the mounting block is bonded to the seal.

11. The seal assembly of claim 7 wherein the first member is a tether conduit and the second member is a cross load bearing housing.

12. A seal assembly for sealing between a first member having a cylindrical inner surface centered on a first axis and a second member having a cylindrical outer surface centered on a second axis, the first and second members being positioned in a concentric relationship with the first and second axes normally coincident, the first and second members capable of limited movement relative each other, comprising:

an annular inflatable elastomeric seal;

a plurality of mounting blocks bonded to said elastomeric seal and secured to one of said members to prevent the seal from moving along the axis of said member in a first direction, said mounting blocks being removably secured to said member to remove said mounting blocks and seal from between said inner and outer cylindrical surfaces while the members are in the concentric relationship.

13. A seal assembly for sealing between a first member having a cylindrical inner surface centered on a first axis and a second member having a cylindrical outer surface centered on second axis the first and second members positioned in a concentric relationship with the first and second axes coinciding, with said first and second members capable of limited motion relative each other, comprising:

an annular inflatable seal;

at least one mounting block secured to one of said members to prevent the seal from moving along the axis of the said member in a first direction;

said member defining a lip having an inner annular surface and an outer annular surface, the mounting block being secured to the lip; and a continuous groove being formed into one of the surfaces of said lip, said mounting block further comprising a locking pin movable between a release position and a locking position, the pin in the locking position entering the groove to secure the mounting block to said member.

14. A seal assembly for sealing between a first member having a cylindrical inner surface centered on a first axis and a second member having a cylindrical outer surface centered on a second axis the first and second members positioned in a concentric relationship with the first and second axes coinciding, with said first and second members capable of limited motion relative each other, comprising:

an annular inflatable elastomeric seal;

a plurality of mounting blocks bonded to said elastomeric seal and secured to one of said members to prevent the seal from moving along the axis of said member in a first direction;

said member defining a lip having an inner annular surface and an outer annular surface, a continuous groove being formed into one of said surfaces, each of said mounting blocks having a locking pin mounted thereon for movement between a release position and a locking position, the locking pin in the locking position entering the groove to secure the mounting block to the said member.

* * * * *